May 18, 1943     E. A. HOEH     2,319,404
VALVE
Filed Aug. 25, 1941
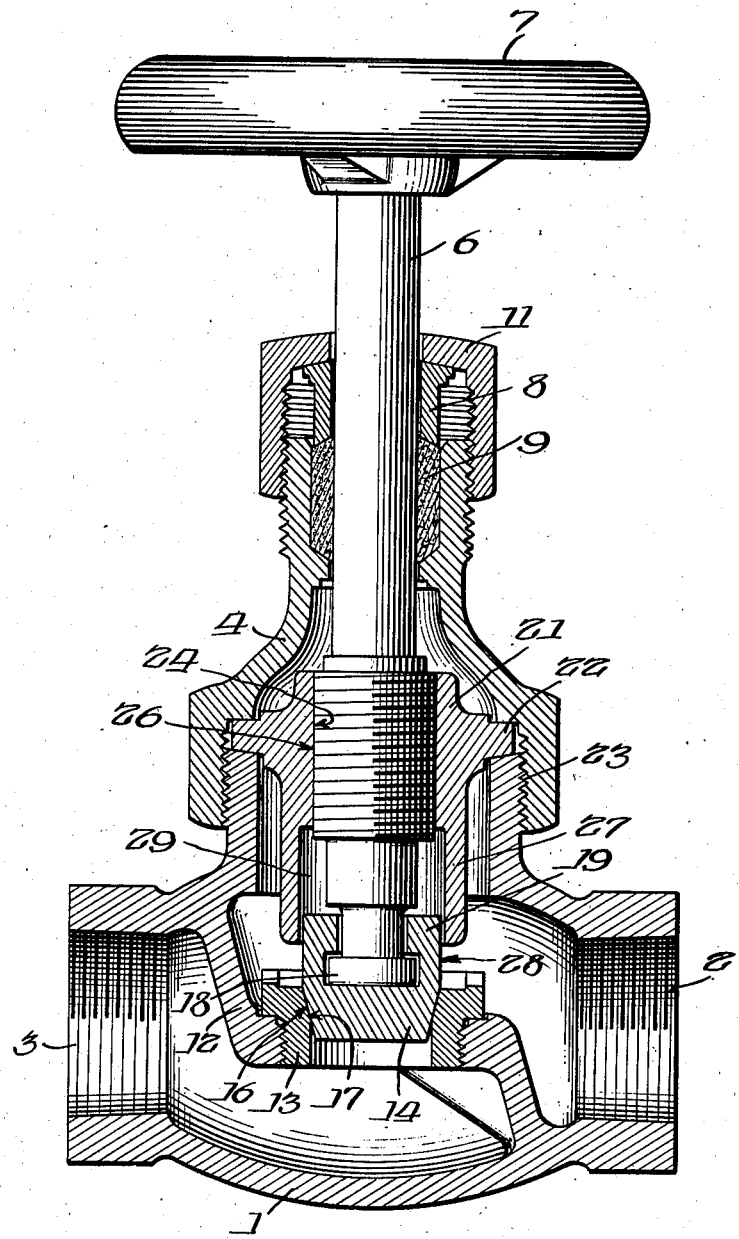
Inventor:
Earl A. Hoeh.
By: Joseph O. Lange Atty.

Patented May 18, 1943

2,319,404

UNITED STATES PATENT OFFICE 2,319,404

VALVE

Earl A. Hoch, Chicago, Ill., assignor to Crane Co., Chicago, Ill., a corporation of Illinois Application August 25, 1941, Serial No. 408,189

1 Claim. (Cl. 251—49)

This invention relates generally to improvements in a valve construction which will improve the performance and increase the normal operating life of the device.

A principal object of my invention is to provide a novel internally threaded busing removably inserted within a valve for operative engagement with the valve stem.

A further object is to provide a valve with a busing as described the bushing having an axial extension closely encircling an outer portion of the valve disc whereupon the latter is positively guided in its reciprocation to and from the valve seat.

Another purpose of my invention resides in the provision of a bushing within a valve removably maintained by engagement with the valve body and the valve bonnet and further being formed at one end in such a manner as to substantially contain the valve disc and to guide the latter to and from the valve in a manner free from vibration induced by fluid turbulence within the valve.

Heretofore, the service life of a valve was usually determined by the life of the threaded surfaces on the stem and in the bonnet, and a life of 2000 operations was considered good. As the years passed, developments have been made for the purpose of increasing the service life of valves. Since the stem was the smaller of the two parts referred to, it was found more economical to improve its wear resistance by utilizing better and more expensive metals. Some improvement of course was made in the wear resistance of the bonnet, also, but due to its bulk it was usually not economical to construct it of the highest class of wear resistant materials as could be employed in the stem; further, it was not feasible to construct the bonnet of the tough rolled materials which could be utilized in the stem. By continuous development work on the stems and to a less effective extent upon the valve bonnets, stems were finally produced which could be used for as many as 200,000 operations but the threads in the bonnets would frequently fail more quickly. Accordingly, one of the more recent improvements has been to provide a removable internally threaded bushing within the bonnet in operative relationship with the threaded part of the stem; this threaded bushing can be economically manufactured of material which is quite as wear resistant and as satisfactory in other respects as the present day superior stem alloys.

While attention in the past has been directed to improving the wear resistance of the threaded parts of valves, relatively little attention has been given and practically no improvements have been made to eliminate the chattering or random vibrations of globe valve discs upon the occurrence of flow through the valve and my invention is particularly concerned with providing a valve free from this fault, in addition to increasing the life of all threaded surfaces.

It is thus a specific object to provide a valve of the globe type with a removable and renewable bushing cooperating with the stem and with the disc or closure member in such a manner as to result in simultaneous improvement in the wear resistance of the threaded surfaces and also provide a positive guiding means for the disc to prevent random vibrations thereof.

Other objects and advantages will become more readily apparent to one skilled in the art upon examination of the subsequent detailed description of one form of my device which is to be taken in connection with the accompanying drawing, in which The figure illustrates one form of the device as it would be employed in a rising stem globe valve.

Throughout the drawing like parts are designated by like reference characters.

Referring now in detail to the figure of the drawing, a conventional plug type globe valve is illustrated having the body generally designated 1, respective inlet and outlet ports 2 and 3, the bonnet 4, the stem 6, and the handwheel 7 fixedly attached to the upper end of the stem. The packing gland 8 surrounds the stem in the usual manner and is adapted to be forced downward into the packing chamber 9 by rotation of the packing nut 11 which is threadedly engaged with the upper part of the bonnet 4. The inside portion of the valve body 1 contains the usual integrally formed bridge wall or diaphragm 12 separating the upstream from the downstream portions of the valve, the bridge wall having the renewable seat 13 threadedly engaged therewith. The closure member or disc 14 has formed thereon a frusto-conical shaped seating surface 16 adapted to engage in a sealing manner with a similarly shaped seating face 17 formed on the interior of the seat ring 13. The disc 14 may be attached in any suitable manner to the lower portion of the stem 6, preferably in such a manner that the disc may be readily detached from the stem in order that the renewability of either may be facilitated at minimum cost and the greatest dispatch. In the drawing, for instance, the lower portion of the stem terminates in a flange 18 which normally, in the assembled condition, extends outwardly beneath cooperating flanges 19 formed on the upper or back portion of the disc 14.

The essence of my invention is represented in the figure by the bushing generally designated 21; it is maintained firmly within the valve casing by the interposition of an integral flanged extension 22 between the sealing surfaces of the bonnet 4 and the body 1, the upper and lower surfaces of the flanged portion 22 having the shape of a continuous annulus and cooperating with similar surfaces in the bonnet and body respectively to form a fluid tight seal when the flange 22 is clamped between the bonnet and the body upon moving the former down upon the latter by means of the threads at 23. The bushing 21 is threaded internally as at 24, these bushing threads being adapted to mate with similarly formed threads 26 upon the exterior of the stem 6. The lower portion of the bushing 21 comprises a continuous annular extension 27 within which the outer peripheral surface 28 of the disc 14 is snugly journaled. Whereas a continuous annular shape is shown for the extension 27, it may be preferable in some instances, as where there is the possibility of fluid congealing into a solid in the chamber 29 above the disc, to construct this annular extension 27 discontinuously, that is, in the form of a number of annularly arranged, axially extending prongs or recessed portions.

In the operation of the device shown in the figure, counter-clockwise rotation (looking down) of the handwheel 7 will cause the stem to lift and to turn because of the threaded engagement with the fixed bushing 21; in lifting, the stem will draw the disc upwardly and away from the seat into the chamber 29; as the seating surfaces 16 and 17 are drawn apart by this upward movement of the disc, fluid flow will occur through the valve and eddy currents, due to random localized and uncontrolled flow conditions existing from point to point within the valve body, will ordinarily cause turbulent forces to be created within the valve which will act first upon one side or portion of the disc and then upon another to cause chattering or other objectionable motion of the disc. However, by virtue of the downwardly extending portion 27 of the bushing 21, thus snugly restraining the disc within the chamber 29, the usual looseness or relatively free motion of the disc upon the lower part of the stem will have been very effectively restrained and the disc will neither chatter nor flutter in response to the aforesaid turbulent forces acting upon it. This is in contradistinction to the performance of the ordinary valve not so equipped and in which the vibrations of the disc about the stem generally result in the early failure of the disc-stem connection.

As shown in the figure, the lower surface of the flange 22 is of downward-diminishing frusto-conical shape and fits a similarly shaped upper surface of the body, thus providing for accurate self-centering of the bushing within the body. In some cases, however, it may be preferred to form these surfaces flat whereby the bushing may possess some degree of transverse adjustability in order to facilitate convenient alignment with the seat in case the latter and the upper body opening have not been formed accurately concentric.

Other advantages which I secure by my device over ordinary valves not equipped with such an improvement may be summarized as follows:

I. The upper portion of the disc is at all times protected from fluid turbulence which tends to contribute to vibration.

II. It permits of the use of a readily dismountable disc-stem connection which is considerably simpler and far more economical to manufacture than the conventional connection employing a disc-stem ring threadedly engaged with the back of the disc and interlocking with an enlarged portion of the stem.

III. The size of the disc may be made much smaller than in the conventional valve, thereby effecting a saving of the relatively expensive high grade disc metal.

IV. Concentricity of the stem and the disc is positive at all times.

V. Every moving and wearing part which may conceivably be necessary to replace is made removable and hence replaceable at low cost.

While my invention has been shown in its application to the ordinary plug type of globe valves it should be understood that it is not thus limited but may be employed in many other types of rising stem valves. Having thus described only a few of the many forms in which my invention may be utilized with advantage, the appended claim should be interpreted in light of the prior art.

I claim:

A valve comprising a body having a seat therein, a bonnet, a rising stem, a removable bushing aligned with said seat and having a portion disposed within and peripherally spaced from said body and an annular portion clamped between said body and said bonnet, means comprising frusto-conical surfaces on said annular portion and said body for bringing said body and said bushing into concentric relation in assembling said valve, a closure member for said seat carried by said stem and reciprocably mounted in said bushing, said stem being threaded in said bushing whereby axial movement of said closure member is effected by rotation of said stem.

EARL A. HOEH.